US010915535B2

United States Patent
Chen et al.

(10) Patent No.: US 10,915,535 B2
(45) Date of Patent: Feb. 9, 2021

(54) OPTIMIZATIONS FOR A BEHAVIOR ANALYSIS ENGINE

(71) Applicant: NEC Laboratories America, Inc., Princeton, NJ (US)

(72) Inventors: Haifeng Chen, Windsor, NJ (US); Youfu Li, Los Angeles, CA (US); Daeki Cho, Highland Park, NJ (US); Bo Zong, New York, NY (US); Nipun Arora, Plainsboro, NJ (US); Cristian Lumezanu, Princeton Junction, NJ (US)

(73) Assignee: NEC Corporation

( * ) Notice: Subject to any disclaimer, the term of this patent is extended or adjusted under 35 U.S.C. 154(b) by 300 days.

(21) Appl. No.: 15/983,404

(22) Filed: May 18, 2018

(65) Prior Publication Data

US 2018/0365291 A1 Dec. 20, 2018

Related U.S. Application Data

(60) Provisional application No. 62/520,632, filed on Jun. 16, 2017, provisional application No. 62/561,912, filed on Sep. 22, 2017.

(51) Int. Cl.
*G06F 16/2455* (2019.01)
*G06N 20/00* (2019.01)
*G06F 16/22* (2019.01)
*G06F 16/2453* (2019.01)
*G06N 5/04* (2006.01)

(52) U.S. Cl.
CPC .... *G06F 16/24564* (2019.01); *G06F 16/2246* (2019.01); *G06F 16/2453* (2019.01); *G06F 16/24542* (2019.01); *G06F 16/24549* (2019.01); *G06N 5/046* (2013.01); *G06N 20/00* (2019.01)

(58) Field of Classification Search
CPC .......... G06F 16/24564; G06F 16/2246; G06F 16/24549; G06F 16/2453; G06N 20/00; G06N 5/046
See application file for complete search history.

(56) References Cited

U.S. PATENT DOCUMENTS

| 2009/0018992 A1* | 1/2009 | Zuzarte | G06F 16/2453 |
| 2011/0047525 A1* | 2/2011 | Castellanos | G06F 16/283 |
| | | | 717/104 |
| 2015/0081666 A1* | 3/2015 | Long | G06F 16/2453 |
| | | | 707/713 |

OTHER PUBLICATIONS

Alsubaiee, Sattam, et al. "AsterixDB: A scalable, open source BDMS." Proceedings of the VLDB Endowment 7.14 (2014): 1905-1916.
Apache Spark, https://spark.apache.org/, 2018, The Apache Software Foundation.
Apache Hive, https://hive.apache.org/, 2018, The Apache Software Foundation.
Apache Pig, https://pig.apache.org/, 2018, The Apache Software Foundation.

* cited by examiner

*Primary Examiner* — Kannan Shanmugasundaram
(74) *Attorney, Agent, or Firm* — Joseph Kolodka

(57) ABSTRACT

Systems and methods for optimizing query execution to improve query processing by a computer are provided. A query is analyzed and translated into a logical plan. A runtime query optimizer is applied to the logical plan to identify a physical plan including operators for execution. The logical plan is translated into the physical plan. Execution of the query is scheduled according to the physical plan.

15 Claims, 15 Drawing Sheets

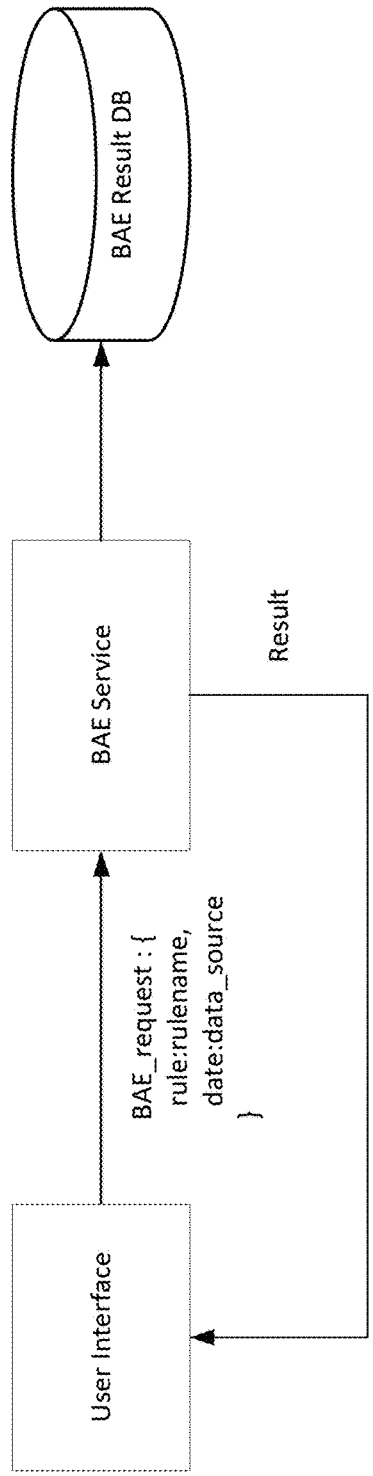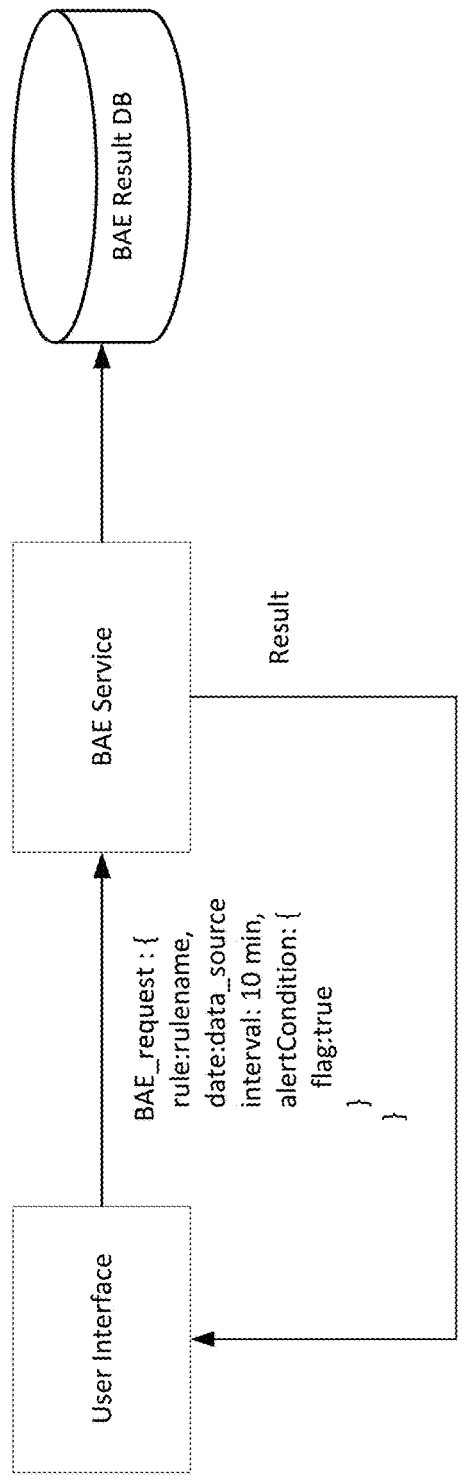

```
[header]
NAMESPACE=NET.BASE_PROTO;
NAME = IPPKTPAIR;

[states]
QUALIFIER : {
    qualifier1 = {_type = 'test', _timestamp=timestamp:timestamp (double)};
    qualifier2 = {_type = 'test', _timestamp=timestamp:timestamp (double)};
};

qualifier1 : {
    ip_pkt_sd = {IP.src = $1, IP.dst = $2, IP.proto=$3};
};

qualifier2 : {
    ip_pkt_ds = {IP.src = $ip_pkt_sd.IP.dst, IP.dst = $ip_pkt_sd.IP.src,
                 IP.proto=$ip_pkt_sd.IP.proto};
};

[behavior]
# INIT is prepended to all behaviors by default
ip_pkt_pair = ip_pkt_sd ~>[>1] ip_pkt_ds;

[model]
IP_PKTPAIR() = ip_pkt_pair;
```

```
Initialize Iterator Iter_left and Iter_right for PAR_left and
PAR_right, respectively.
var output = empty
var row_l = Iter_left.getRow();
var row_r = Iter_right.getRow();
var key_l = row_l.getKey();
var key_r = row_r.getKey();
while (Iter_left.hasNext() && Iter_right.hasNext()){
   if( key_l = key_r) {
      Join row_l and row_r --> Pair(row_l, row_r);
      if(Pair(row_l, row_r) statisfy VER_CON){
         output += Pair(row_l, row_r);
         row_l = Iter_left.advanceNext();
         key_l = row_l.getKey();
      } else {
         row_r = Iter_right.advanceNext();
         key_r = row_r.getKey();
      }
   } else if(key_l < key_r){
      row_l = Iter_left.advanceNext();
      key_l = row_l.getKey();
   } else {
      row_r = Iter_right.advanceNext();
      key_r = row_r.getKey();
   }
}
```

```
Initialize Iterator Iter_left and Iter_right for PAR_left and
PAR_right, respectively.
Initialize hashM, a hash map to keep record of already paired rows
in PAR_right.
var output = empty
var row_l = Iter_left.getRow();
var row_r = Iter_right.getRow();
var key_l = row_l.getKey();
var key_r = row_r.getKey();
while (Iter_left.hasNext() && Iter_right.hasNext()){
   if( key_l = key_r) {
      if(row_r.hashcode is not in hashM){
         Join row_l and row_r --> Pair(row_l, row_r);
         if(Pair(row_l, row_r) statisfy VER_CON){
            output += Pair(row_l, row_r);
            put row_r.hashcode into hashM;
            row_l = Iter_left.advanceNext();
            key_l = row_l.getKey();
         } else {
            row_r = Iter_right.advanceNext();
            key_r = row_r.getKey();
         }
      } else {
         row_r = Iter_right.advanceNext();
         key_r = row_r.getKey();
      }
   } else if(key_l < key_r){
      row_l = Iter_left.advanceNext();
      key_l = row_l.getKey();
   } else {
      row_r = Iter_right.advanceNext();
      key_r = row_r.getKey();
   }
}
```

```
Initialize Iterator Iter_left and Iter_right for PAR_left and PAR_right,
respectively.
var bufferedMatches = empty
var output = empty
var row_l = Iter_left.getRow();
var row_r = Iter_right.getRow();
var key_l = row_l.getKey();
var key_r = row_r.getKey();
var previous_key = key_l;

while (Iter_left.hasNext() && Iter_right.hasNext()){
   while( key_l = key_r && Iter_right.hasNext()) {
      Join row_l and row_r --> Pair(row_l, row_r);
      if(Pair(row_l, row_r) statisfy KEY_TEMP_CON){
         bufferedMatches += row_r;
         row_r = Iter_right.advanceNext();
         key_r = row_r.getKey();
      } else {
         output += Pair(row_l, bufferedMatches).filter(VER_CON);
         row_l = Iter_left.advanceNext();
         key_l = row_l.getKey();
         if( key_l != previous_key) {
            previous_key = key_l;
            bufferedMatches.clear();
         }
      }
   }
   if(key_l < key_r){
      output += Pair(row_l, bufferedMatches).filter(VER_CON);
      row_l = Iter_left.advanceNext();
      key_l = row_l.getKey();
      if( key_l != previous_key) {
         previous_key = key_l;
         bufferedMatches.clear();
      }
   } else {
      row_r = Iter_right.advanceNext();
      key_r = row_r.getKey();
   }
}
```

```
Initialize Iterator Iter_left and Iter_right for PAR_left and PAR_right,
respectively.
var bufferedMatches = empty
var output = empty
var row_l = Iter_left.getRow();
var row_r = Iter_right.getRow();
var key_l = row_l.getKey();
var key_r = row_r.getKey();
var previous_key = key_l;
while (Iter_left.hasNext() && Iter_right.hasNext()){
    if(KEY_TEMP_CON is not null) {
        while( key_l = key_r && Iter_right.hasNext()) {
            Join row_l and row_r --> Pair(row_l, row_r);
            if(Pair(row_l, row_r) statisfy KEY_TEMP_CON){
                bufferedMatches += row_r;
                row_r = Iter_right.advanceNext();
                key_r = row_r.getKey();
            } else {
                output += Pair(row_l, bufferedMatches).filter(VER_CON);
                row_l = Iter_left.advanceNext();
                key_l = row_l.getKey();
                if( key_l != previous_key) {
                    previous_key = key_l;
                    bufferedMatches.clear();
                }
            }
        }
    } else {
        while( key_l = key_r && Iter_right.hasNext()) {
            bufferedMatches += row_r;
            row_r = Iter_right.advanceNext();
            key_r = row_r.getKey();
        }
    }
    if(key_l < key_r){
        output += Pair(row_l, bufferedMatches).filter(VER_CON);
        row_l = Iter_left.advanceNext();
        key_l = row_l.getKey();
        if( key_l != previous_key) {
            previous_key = key_l;
            bufferedMatches.clear();
        }
    } else {
        row_r = Iter_right.advanceNext();
        key_r = row_r.getKey();
    }
}
```

FIG. 15

OPTIMIZATIONS FOR A BEHAVIOR ANALYSIS ENGINE

RELATED APPLICATION INFORMATION

This application claims priority to U.S. Provisional Patent Application No. 62/520,632, filed on Jun. 16, 2017, and U.S. Provisional Patent Application No. 62/561,912, filed on Sep. 22, 2017, both incorporated by reference herein in their entirety.

This application is related to an application entitled "Artificial Intelligence Driven Declarative Analytic Platform Technology," having Ser. No. 15/983,356 and filed concurrently, which is incorporated by reference herein in its entirety.

BACKGROUND

Technical Field

The present invention relates to log analytics, and more particularly to artificial intelligence driven declarative analytic platform technology for building industry-specific knowledge bases.

Description of the Related Art

Modern day computer systems are plagued by security attacks by, for example, hackers, complex software bugs, and computer and software crashes. When a problem occurs in a system, the de facto way of diagnosing the system problem is by analyzing system generated logs (e.g., by a system administrator or operator).

SUMMARY

According to an aspect of the present principles, a computer-implemented method is provided for optimizing query execution to improve query processing by a computer. The method includes a processor operatively coupled to a memory analyzing a query, translating the query into a logical plan, applying a runtime query optimizer to the logical plan to identify a physical plan including operators for execution, translating the logical plan into the physical plan, and scheduling execution of the query according to the physical plan.

According to another aspect of the present principles, a computer program product having program instructions embodied therewith is provided. The program instructions are executable by a computer to cause the computer to perform a method for optimizing query execution to improve query processing by a computer. The method includes analyzing a query, translating the query into a logical plan, applying a runtime query optimizer to the logical plan to identify a physical plan including operators for execution, translating the logical plan into the physical plan, and scheduling execution of the query according to the physical plan.

According to another aspect of the present principles, a system is provided for optimizing query execution to improve query processing by a computer. The system includes at least one processor operatively coupled to a memory. The at least one processor is configured to analyze a query, translate the query into a logical plan, apply a runtime query optimizer to the logical plan to identify a physical plan including operators for execution, translate the logical plan into the physical plan, and schedule execution of the query according to the physical plan.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 4 is an example of a single run request, in accordance with the present principles;

FIG. 5 is an example of a batch run request, in accordance with the present principles;

FIG. 9 is an example of an input rule, in accordance with the present principles;

FIG. 12 is an example of pseudocode for implementing a partition merging process for a Leadto operator, in accordance with the present principles;

FIG. 13 is an example of pseudocode for implementing a partition merging process for a LeadtoPair operator, in accordance with the present principles;

FIG. 14 is an example of pseudocode for implementing a partition merging process for an Overlap operator or a During operator, in accordance with the present principles;

FIG. 15 is an example of pseudocode for implementing a partition merging process for a Startwith operator or an Endwith operator, in accordance with the present principles;

DETAILED DESCRIPTION OF PREFERRED EMBODIMENTS

Figure 1:
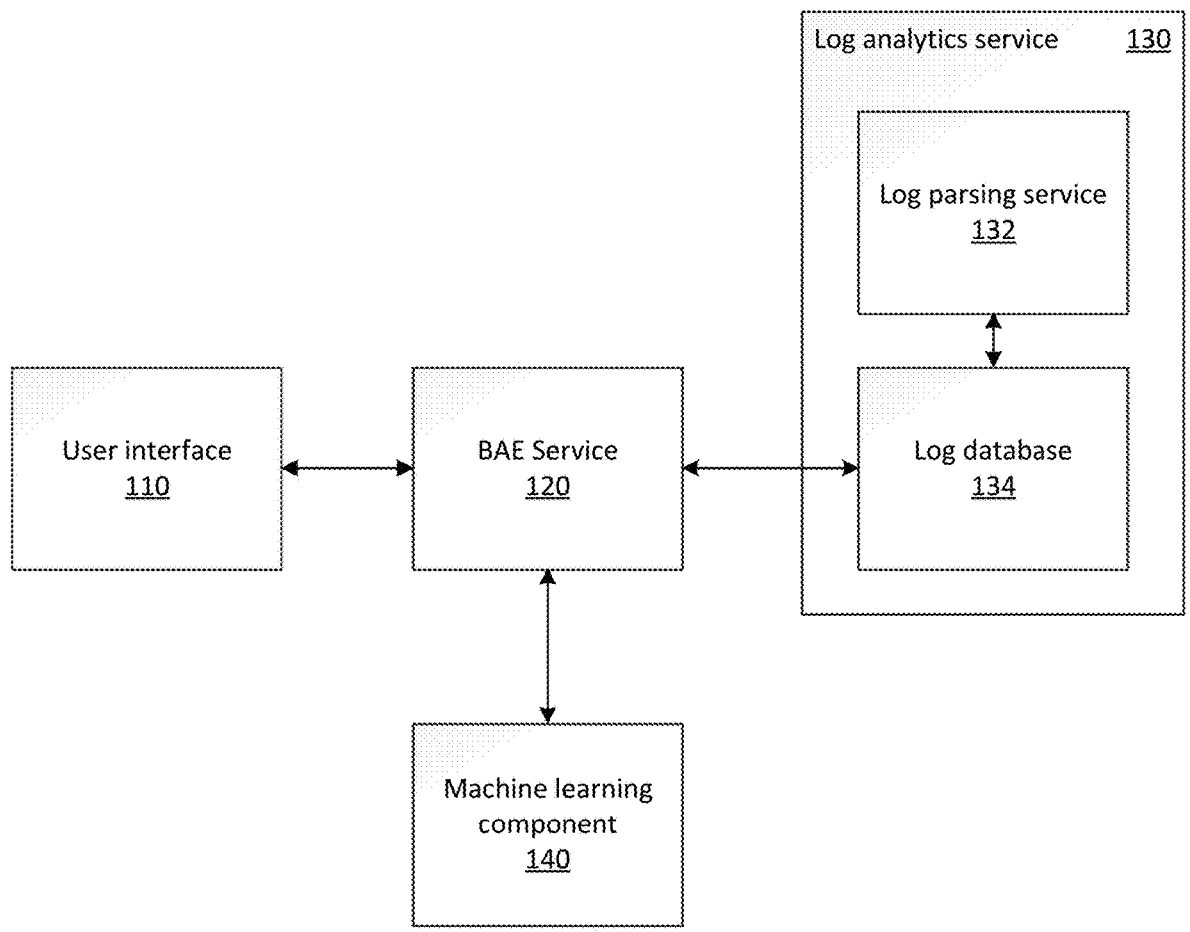
FIG. 1 is a block diagram illustrating an overview of a system/method for implementing a Behavior Analysis Engine (BAE), in accordance with the present principles.

Lack of knowledge of system behavior and heterogeneity of system generated logs can make it more difficult to diagnose a system problem by analyzing the system generated logs (e.g., by a system administrator or operator). If there is an expert who has a deep understanding about the system behavior, it may be helpful for that expert to provide such system knowledge for diagnosing the system problem. However, such system knowledge may not be straightforward to provide due to, for example, a lack tools for intelligently representing the system knowledge. Moreover, since the modern service oriented system can include many different components (e.g., application servers and databases), the number of logs generated by those components increases. Accordingly, operators can end up spending more time determining the root-cause of the system problem, even with knowledge about the system behavior.

The embodiments described herein provide for a system and method, referred to herein as a Behavior Analysis Engine (BAE), that can efficiently manage knowledge about system anomaly behavior by combining machine learning and knowledge input from experts on system behavior for building industry-specific knowledge bases (e.g., repositories of application behavior for any log generating services). For example, the embodiments described herein can provide a solution for log data (e.g., heterogeneous log data) that analyzes a large amount of log data to extract data that matches to the behavior defined in the declarative language, and can convert unstructured log data into a well-defined structure. The embodiments described herein are not limited to applications to a network system, but can also be expanded to general log analysis by leveraging log parsing technology.

A user interface can be provided to visualize existing knowledge and/or rules, and/or compose new knowledge as a rule from scratch or from any existing knowledge. Moreover, the generated rules could be sharable with others. To make the knowledge richer by not solely relying on expert knowledge input (e.g., by covering more failure cases than experts can determine), the embodiments described herein can provide a way for a machine to learn abnormal behaviors based on prior knowledge. Once new knowledge is discovered via the machine learning, an expert can review the model and store it as a rule in the knowledge pool. The embodiments described herein can provide an efficient distributed system that can process the rules on top of a massive amount of log data. Accordingly, the embodiments described herein provide (1) a framework and utility for log exploration and querying using semantic language and leveraging big data platforms to provide a big data platform solution for large and/or heterogeneous log data sets, and (2) a framework that provides an interface to the machines that can learn abnormal system behaviors to minimize manual contribution to rules, and to enrich the knowledge-base by covering more dimensions of system behaviors.

The embodiments described herein can further provide for a global rule management service, which can be cloud-based, that stores all the created rules with associated data patterns. For example, when a new dataset is introduced in a local BAE service, the global rule management service can suggest any relevant existing rule set based on sample data from the local BAE service. Through this global rule management system, knowledge reusability can be maximized while minimizing rule redundancy.

The embodiments described herein can improve a computer system that generates log data. For example, a log pattern can be extracted from each line of the log data. The log pattern can be extracted using any method in accordance with the embodiments described herein. The log pattern can be correlated with the particular system name or identification to be stored in the global rule storage. Data that the computer system can generate can include, e.g., packet capture (PCAP) data, which can include a source IP, port, destination IP, etc, where the format of the data is somewhat fixed. Thus, for a sample PCAP data, a pattern of the sample PCAP data can be extracted and the pattern can be mapped to the existing patterns in the global rule base. An example of such a computer system 300 is described in further detail below with reference to FIG. 3, which includes a distributed system layer 310, a data layer 320 and a local rule-base 330.

A rule can be written as a file that includes multiple sections. In one embodiment, the sections can include a header section, a state section, a behavior section and a model section. The header section specifies namespace, name of rule file and rule inheritance. The state section specifies state information to read the data from a database, and can include an atomic formula for capturing events that satisfy specified relations between attribute and their values. The behavior section defines the execution between one or more states using supported operations. The model section provides the format of the output. An example of a rule file 900 is provided with reference to FIG. 9.

In one embodiment, the supported operations can include logical (Boolean) operations, set operations and temporal operations.

Regarding logical operations, a logical operation assumes that two input states (e.g., state1 and state2) have one line of data, which contains a single Boolean value with true or false. This format of state can be obtained using behavior constraints. If the data is in the wrong format, an exception will be thrown. The output state of the logical operation will contain a single Boolean value.

One example of a supported logical operation is the "AND" operation. The "AND" operation can be represented by a "&" operator and can have grammar in the form of "state1 & state2". The output state will be true if both state1 and state2 are true.

Another example of a supported logical operation is the "OR" operation. The "OR" operation is represented by a "|" operator and can have grammar in the form of "state1|state2". The output state will be true if either state1 or state2 is true.

Another example of a supported logical operation is the "XOR" operation. The "XOR" operation can be represented by a "^" operator and can have grammar in the form of "state1^state2". The output state will be true if only one of state1 and state2 is true.

Regarding set operations, one example of a supported set operation is a filter operation, which filters a state based on input values. The filter operation can have grammar in the form of "filter [(key=value)+] state".

Another example of a supported set operation is an intersection operation, which returns common values of common columns in the input states. The intersection operation can have grammar in the form of "state1 intersection state2".

Another example of a supported set operation is a union operation, which returns a union of common columns in the input states. The union operation can have grammar in the form of "state1 union state2".

Another example of a supported set operation is a symmetric difference (symmdiff) operation, which returns a symmetric difference of common columns in the input states. The symmdiff operation can have grammar in the form of "state1 symmdiff state2."

Another example of a supported set operation is a not-in operation, which returns state1 values that are not in state2 based on common columns. The not-in operation can have grammar in the form of "state1 notin state2".

The set operations, except for the filter operation, can be performed based on common columns in the input data. For example, state1 can include one column C1 containing values a1 and a2, while state2 can include two columns C1 and C2 with one row of data (a1, b1). With these two example states, the intersection operation will have one column C1 with a single value a1. With the not-in operation, the output will also have a column C1, but with a single output a2.

Regarding temporal operations, temporal operations use temporal order values (e.g., begintime and endtime given in the state qualifier definition) to perform temporal comparisons. An input state can include of multiple rows, and the schema of each row can follow the structure in the state definition. The output of the temporal operation is a set of concatenated two rows from two input states where those rows satisfy the temporal condition.

For example, for an input state ip_pkt_sd={IP.src=$1, IP.dst=$2, IP.proto=$3}, the input state ip_pkt_sd includes three columns IP.src, IP.dst, and IP.proto, and can include two additional columns for the temporal ordering (e.g., begintime and endtime).

In some cases, one may want to constrain the temporal operation (e.g., constrain the time difference between input states equal to or less than some number t). Temporal constraints (tc) can be provided to support such a constraint. For instance, →[=t] is a temporal constraint for the "Leadto" operation that finds "Leadto" cases where time difference between state1's endtime and state2's begintime is equal to "t".

The following Table 1 is a table of examples of temporal operations, including name, operator, grammar, and description:

TABLE 1

| Name | Operator | Grammar | Description |
|---|---|---|---|
| Satisfied | [ ] | [ ] state | a state is always satisfied (i.e., satisfied by each event) |
| Leadto (first match) | ~> | state1 ~> state2 | ∃ Bstate ⊆ L, Bstate1.endtime <= Bstate2.begintime<br>State1 leads to state2, that is, whenever state1 is satisfied state2 will eventually be satisfied. |
|  | ~>[tc] | state1 ~> [op num] state2 | ∃ Bstate ⊆ L, (Bstate2.begintime − Bstate1.endtime) op num<br>(Supported op: =, <, and <=) |
| LeadtoPair (unique match) | -> | state1 -> state2 | ∃ Bstate ⊆ L, Bstate1.endtime <= Bstate2.begintime<br>State1 leads to state2, that is, whenever state1 is satisfied state2 will eventually be satisfied. |
|  | ->[tc] | state1 -> [<=num] state2 | ∃ Bstate ⊆ L, (Bstate2.begintime − Bstate1.endtime) op num<br>(Supported op: =, <, and <=) |
| During | dur | state1 dur state2 | ∃ Bstate ⊆ L, Bstate1.begintime > Bstate2.begintime and Bstate1.endtime < Bstate2.endtime<br>State1 occurs during state2, that is State A starts after state B and end before state B. |
|  | dur[tc] | state1 dur [=t1:t2] state2 | ∃ Bstate ⊆ L, t1 <= B state1.duration <= t2 and Bstate1.begintime > Bstate2.begintime and Bstate1.endtime < Bstate2.endtime<br>state1 occurs during state2 with duration between t1 and t2. (Supported temporal operation is range operation) |
| Overlap | olap | state1 olap state2 | ∃ Bstate ⊆ L, Bstate2.begintime < Bstate1.begintime < Bstate2.endtime < Bstate1.endtime<br>State1 overlaps state2, i.e., state1 starts after state2 starts but before state2 ends and ends after state2 ends |
|  | olap[tc] | state1 olap [op num] state2 | In addition to olap, the below constraint needs to be satisfied.<br>(Bstate2 .endtime − Bstate1 .begintime) op num<br>(Supported op: =, <, >, >=, and <=) |
| Start with | sw | state1 sw state2 | ∃ Bstate ⊆ L, Bstate1.begintime = Bstate2.begintime<br>State1 starts with State2 |
|  | sw[tc] | state1 sw [>=num] state2 | ∃ Bstate ⊆ L, Bstate1.begintime − Bstate2.begintime op num<br>State1 starts t time units after/before state2<br>(Supported op: =, <, >, >=, and <=) |
| End with | ew | state1 ew state2 | ∃ Bstate ⊆ L, Bstate1.endtime = Bstate2.endtime<br>State1 ends with State2 |
|  | ew[tc] | state1 ew [=num] state2 | ∃ Bstate ⊆ L, Bstate1.endtime − Bstate2.endtime = num<br>State1 ends t time units after state2. (Supported temporal operation is =) |
| Equal | eq | state1 eq state2 | ∃ Bstate ⊆ L, Bstate1.duration = Bstate2.duration (duration = endtime − begintime)<br>State1 and state2 are equal in duration |
|  | eq[tc] | state1 eq [=num] state2 | ∃ Bstate ⊆ L, Bstate1.duration = Bstate2.duration = num<br>State1 and state2 are both of duration t.<br>(Supported temporal operation is =) |

Behavioral constraints can either check a number of rows in a state or filter the rows within a state.

One example of a behavioral constraint is "Boolean counter." The Boolean counter behavioral constraint can be represented by the operator "Bcount", and can have grammar in the form of "(state)[Bcount op num]", where op can be =, >, <, >=, or <= and num is the line count of the state. Bcount returns true if num satisfies op, otherwise it returns false.

Another example of a behavioral constraint is "start at." The start at behavioral constraint can be represented by the operator "at", and can have grammar in the form of "(state) [at <t]", which returns rows in the state that have a begintime less than t.

Another example of a behavioral constraint is "end with." The end with behavior constraint can be represented by the operator "end", and can have grammar in the form of "(state)[end >=t]", which returns rows in the state that have an endtime greater than or equal to t.

Another example of a behavioral constraint is "duration." The duration behavioral constraint can be represented by the operator "duration", and can have grammar in the form of "(state)[duration op num]", where op can be = or != and num is the line count of the state. Duration returns data in the state that has duration (e.g., endtime-begintime) (not) equal to num (depending on the op).

Referring now in detail to the figures in which like numerals represent the same or similar elements, FIG. 1 shows an overview of a BAE system 100 illustratively depicted in accordance with one embodiment of the present principles.

As shown, the system 100 includes a user interface 110, a BAE service 120, and a log analytics service 130. The user interface 110 provides a unified interface where a user can manage knowledge (e.g., rules) and access the BAE service 120. The BAE service 120 can be accessed to submit a request with a rule and target data from a log database 134 of the log analytics service 130. In one embodiment, the BAE service 120 is provided as a service (e.g., technology as a service (TaaS)) by a service provider. For example, the BAE service can be 120 can be provided as a service (e.g., TaaS) in a cloud computing system. The log database 134 stores parsed log data generated by log parsing service 132.

Further details regarding the components of the user interface 110, the BAE service 120 and the log analytics service 130 will be provided below with reference to FIGS. 2-8.

The system 100 further includes a machine learning component 140. The machine learning component 140 is an external machine learning based component that learns any abnormal behaviors from a training dataset, and converts the findings to (BAE) rules. For example, during the training phase, the machine learning component 140 can learn normal behavior models from a training "normal" dataset and use the models to find any unseen behavior. In the testing phase, if any unseen behavior is found, this unseen behavior is identified as an abnormal behavior candidate. In one embodiment, the abnormal behavior candidate can be further analyzed by an expert to confirm the abnormal behavior candidate as abnormal behavior. In another embodiment, the abnormal behavior candidate is assumed to be abnormal behavior.

A BAE rule manager of the BAE service 120 can take the abnormal behavior as an input to create the rule to be stored into local and global rule bases of the BAE service 120. Accordingly, the machine learning component 140 is an interface where an external component contributes to rule generation via machine learning.

Any suitable machine learning process for learning the abnormal behaviors from the training dataset can be used by the machine learning component 140 in accordance with the embodiments described herein. In one embodiment, rules generated by the machine learning component 140 can be verified by a user via the user interface 110.

Figure 2:
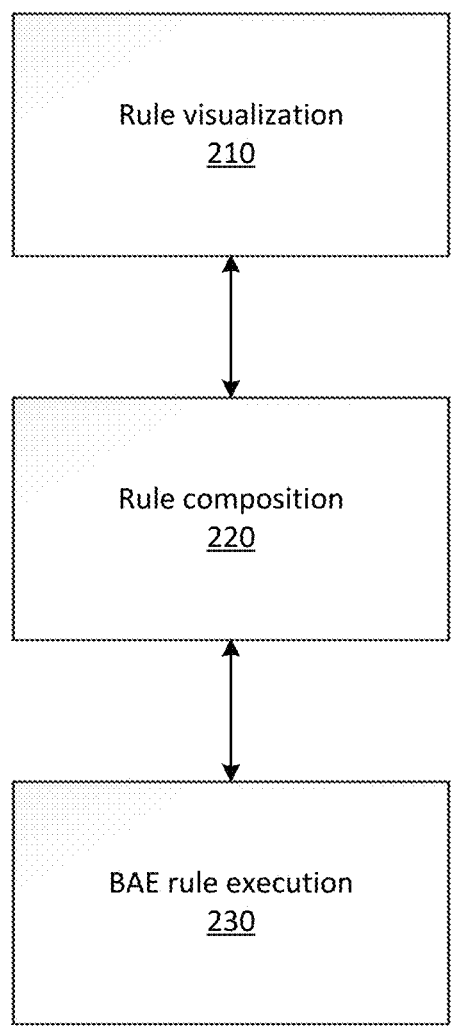
FIG. 2 is a block diagram illustrating a system/method for implementing a user interface of a BAE system, in accordance with the present principles.

Referring now to FIG. 2, an exemplary user interface 200, such as the user interface 110 of FIG. 1, is illustratively depicted in accordance with one embodiment of the present principles.

The user interface 200 includes a rule visualization component 210. The rule visualization component 210 can be used to visualize existing hierarchical rules for various data types, such as packet capture (PCAP), syslog, etc.

For example, suppose there is system architecture including a distributed system layer, a data layer, and a local rule-base. The distributed system layer can include a cluster of servers for providing a service. Each server can run one or more applications that generate different sets of data. Each application can populate its log data to the data layer (e.g., in a log database such as the log database 134 of FIG. 1) and some of data types in the data layer can be the same (e.g., PCAP data). Each dataset generated by an application can be associated with a set of rules, and each set of rules can be illustrated in a bottom-up approach. For example, for PCAP data, the set of rules can be visualized in the order of IP, TCP, and PORTSCAN. An illustrative example of a system architecture 300 is provided in FIG. 3.

Referring back to FIG. 2, the user interface 200 further includes a rule composition component 220. The rule composition component 220 can be used by a user to compose rules with or without using the existing rules. The rule composition component 220 can further be used to verify rules (e.g., rules generated by the machine learning component 140 of FIG. 1). Accordingly, a user (e.g., domain expert) can compose a new rule either from scratch or by extending an existing rule to create higher level meaning.

Figure 3:
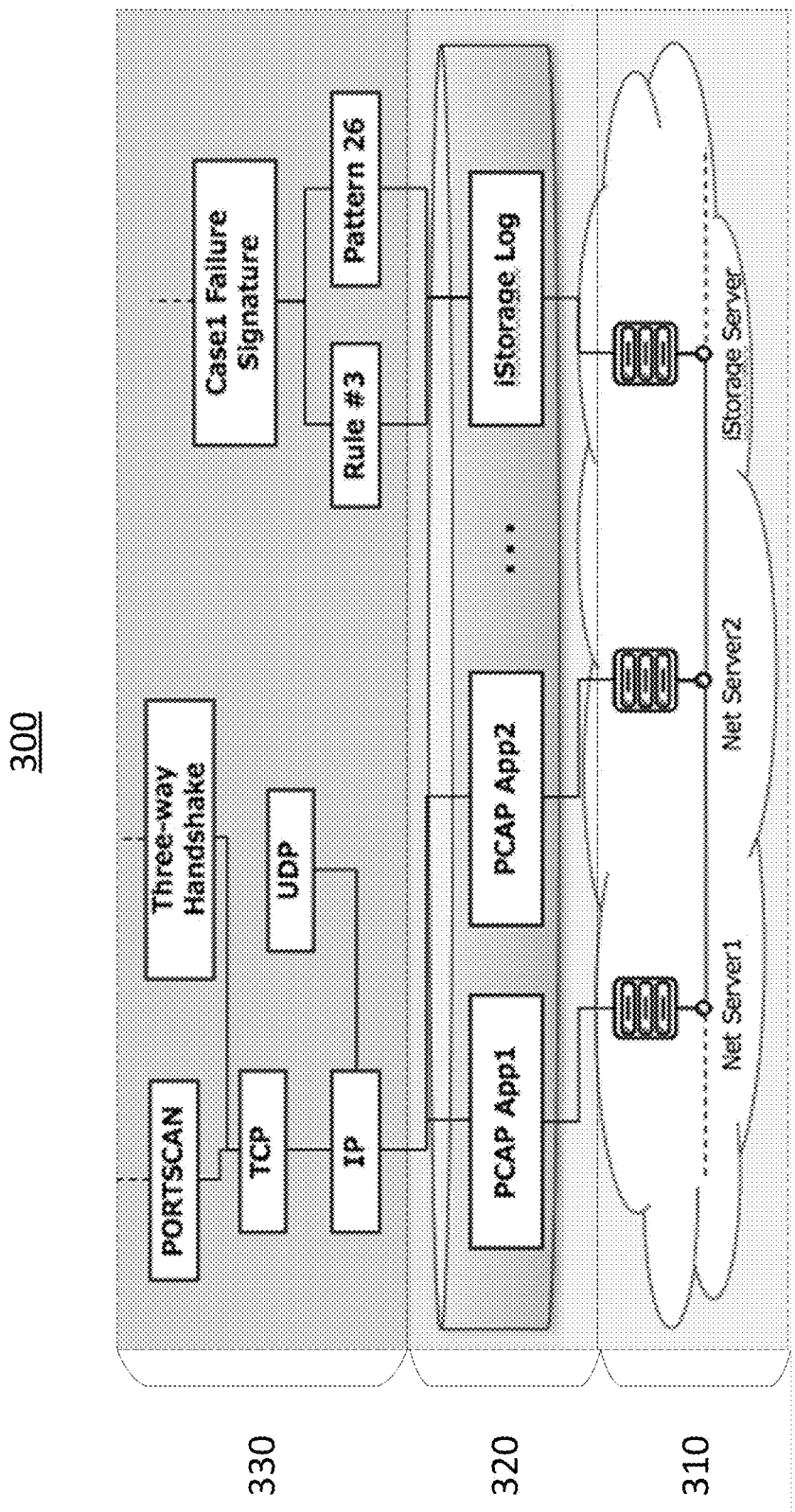
FIG. 3 is an example a system architecture including a distributed system layer, a data layer and a local rule-base, in accordance with the present principles.

For example, referring back to the system architecture of FIG. 3, an IP rule can be used to create TCP rule. Same types of data in different tables can be associated with the same set of rules. When new data is presented, the domain expert can manually write rules, but also BAE rule manager can help to search for a set of existing rules to import from a global rule-base based on the data format.

Referring back to FIG. 2, the user interface 200 further includes a rule execution component 230. The rule execution component 230 provides an interface for a user to execute rules on a dataset (e.g., a dataset in a log database such as the log database 134 of FIG. 1). The rule execution component 230 can also provide a configurable interface so that a user can set BAE batch processes (e.g., periodic triggering).

A user can request a job through the user interface 200. For example, the user interface 200 can provide two different types of request, referred to herein as "single run" and "batch process."

With a single run request, a user can specify the rule name and the target data to be analyzed. When the analysis is done, the user can be provided with a report of the result. An exemplary single run request 400 is illustrated with reference to FIG. 4.

With a batch process request, a user can periodically run the BAE process using the batch service. The user will be alerted when the result matches to an alert condition provided in the request. An exemplary batch run request 500 is illustrated with reference to FIG. 5. In this illustrative example, the batch will be triggered every 10 minutes, and the user will be alerted when the output of one batch run contains "flag" equals to "true".

Figure 6:
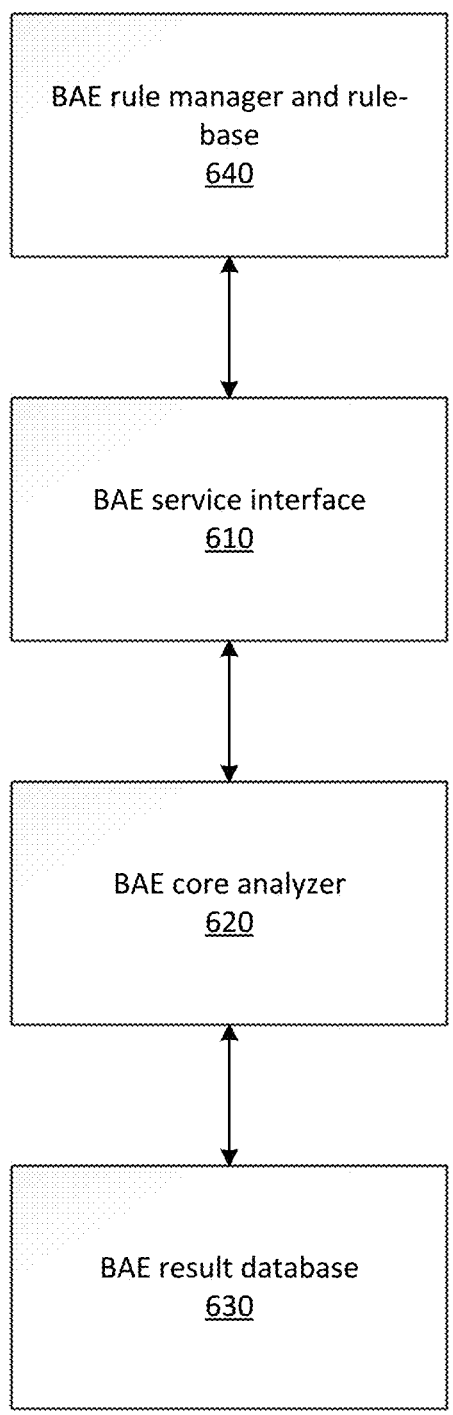
FIG. 6 is a block diagram illustrating a system/method for implementing a BAE service of a BAE, in accordance with the present principles.

Referring now to FIG. 6, a block diagram illustrating a system/method implementing an exemplary BAE service 600, such as the BAE service 120 of FIG. 1, is illustratively depicted in accordance with one embodiment of the present principles.

The BAE service 600 includes a BAE service interface 610. The BAE service interface 610 provides one or more application programming interfaces (APIs) for accessing the BAE service. In one embodiment, the one or more APIs include one or more RESTful APIs. The BAE service interface 610 can communicate with a user interface, such as the user interface 110 of FIG. 1, and a machine learning component, such as the machine learning component 140 of FIG. 1.

The BAE service 600 further includes a BAE core analyzer 620. The BAE core analyzer is the core module that executes BAE requests. The BAE core analyzer 620 parses rule files, optimizes queries, and executes the queries to yield a BAE result. Further details regarding the BAE core analyzer 620 will be described below with reference to FIG. 7.

The BAE service further includes a BAE result database 630. The BAE result database 630 stores results generated by the BAE core analyzer 620.

The BAE service 600 further includes a BAE rule manager and rule-base 640. The BAE rule manager and rule-base 640 helps to compose and validate new rules, and store the new rules in one or more types of rule-bases. In one embodiment, the one or more types of rule-bases include a local rule-base and a global rule-base. The BAE rule manager and rule-base 640 can also support rule visualization for users, and can help users to export existing rules to be used for a given situation. The rules represent knowledge, and should be well organized to minimize the redundancy of similar rules and to maximize reusability. The BAE rule manager 640 is designed to achieve those two goals. Further details regarding the BAE rule manager and rule-base will be described below with reference to FIG. 8.

Figure 7:
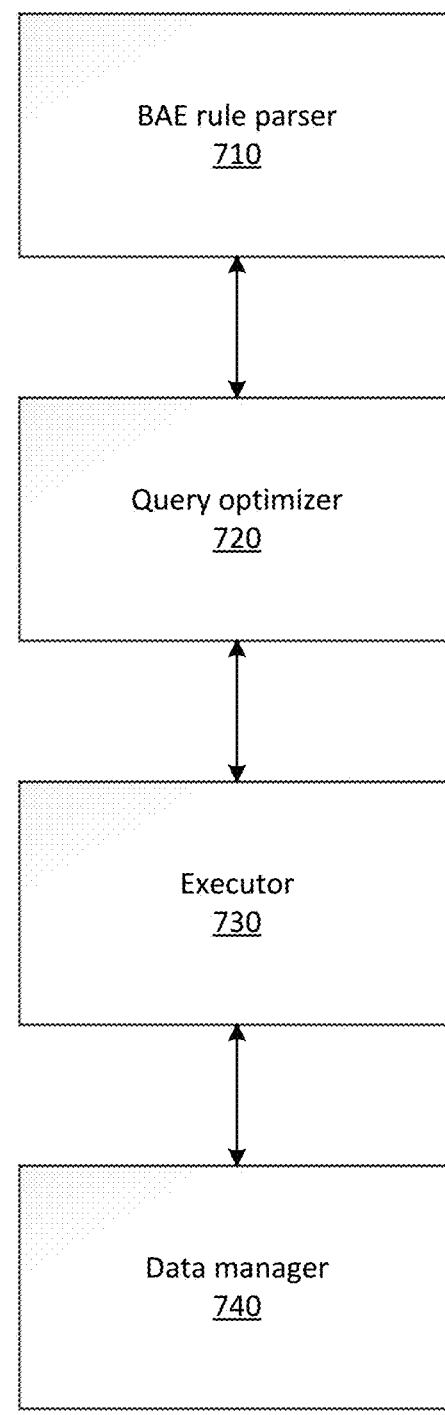
FIG. 7 is a block diagram illustrating a system/method for implementing a BAE core analyzer of a BAE service, in accordance with the present principles.

Referring now to FIG. 7, a block diagram illustrating a system/method implementing an exemplary BAE core analyzer 700, such as the BAE core analyzer 620 of FIG. 6, is provided.

The BAE core analyzer 700 includes a BAE rule parser 710, a query optimizer 720, an executor 730 and a data manager 740. When there is a BAE request, the analyzer takes an input rule file from a BAE rule-base, such as BAE rule-base 650 of FIG. 6. Then, the BAE rule parser 710 can parse the rule file to construct a tree of execution order. The query optimizer 720 can then optimize the tree to reduce the number of future executions. After the optimization is complete, the optimized tree is used to execute operations (e.g., logical, set and temporal).

In one embodiment, there are two stages of executing a rule file. In the first stage, states are formulated by pulling data from a log database, such as the log database 134 of FIG. 1. This pulling of data from the log database is done by the data manager 740, which involves the special feature to minimize the size of data to be pulled. The data manager 740 keeps track of what kind of data has been pulled from the log database and, if the querying is redundant, it pulls data from the local cache. In the second stage, the operations are executed by the executor 730. After the execution is done, the results are stored in a BAE result database, such as the BAE result database 630 of FIG. 6, so that the user can access the output.

Figure 8:
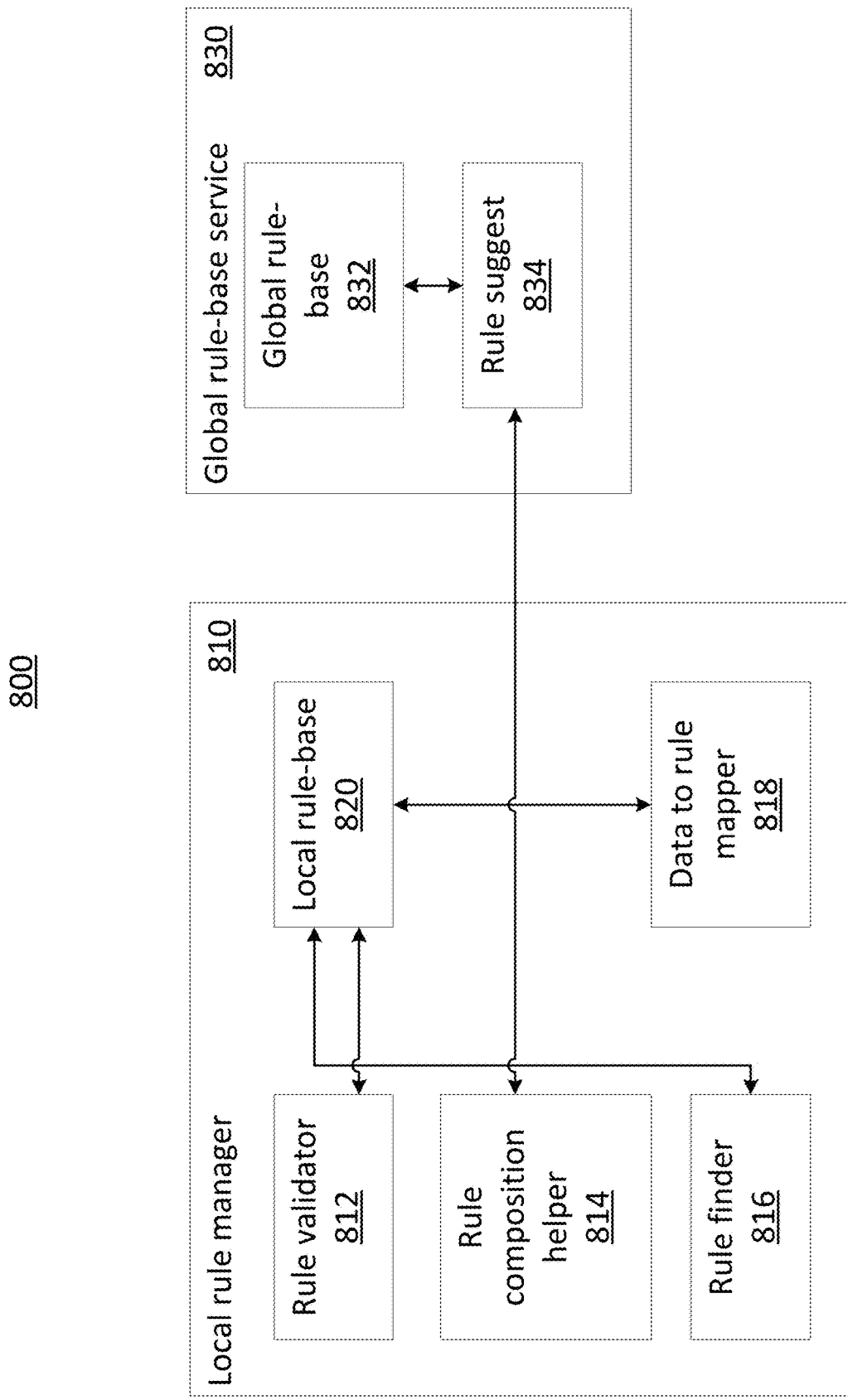
FIG. 8 is a block diagram illustrating a system/method for implementing a BAE rule manager and rule-base of a BAE service, in accordance with the present principles.

Referring now to FIG. 8, a block diagram illustrating a system/method implementing an exemplary BAE rule manager and rule-base 800, such as the BAE rule manager and rule-base 640 of FIG. 6, is provided. As shown, the BAE rule manager and rule-base 800 can include a local rule manager 810 and a global rule-base service 830. The local rule manager 810 is shown including multiple components, including a rule validator 812, a rule composition helper 814, a rule finder 816, a data to rule mapper 818, and a local rule-base 820 (e.g., a rule-base that contains all rules being used in the local system).

The global rule-base service 830 is shown including multiple components, including a global rule-base 832 (e.g., a rule-base that stores all the rules created from distributed applications and provides relevant knowledge to the end-user based on request) and a rule suggest service 834. The global rule-base service 830 is a public global rule management storage, which can be implemented in the cloud, that stores the rules with the data patterns. It can also leverage rule namespaces to organize rules.

The local rule manager 810 can interact with a user interface, such as the user interface 110 of FIG. 1, through a BAE service interface, such as the BAE service interface 610 of FIG. 6. For example, the rule validator 812 can validate an input rule received from the user interface, and can store the input rule in the local rule-base 820 and the global rule-base 832.

A domain expert can composite a new rule either from scratch or by extending an existing rule to create higher level meaning. For example, an IP rule can be used to create a TCP rule. Same type of data in different tables can be associated with the same set of rules. When a new data is presented, the domain expert can write his own rules, but the BAE rule manager and BAE rule-base 800 can also help to search for a set of existing rules to import from the global rule-base 832 based on the data format.

Each input rule can have its own namespace, which is a unique path with the file name, that is used to store the rule file in the rule-bases 820 and 832. The following Table 2 is an example of a namespace for an istorage case1 failure rule file (e.g., com.istorage.case1):

TABLE 2

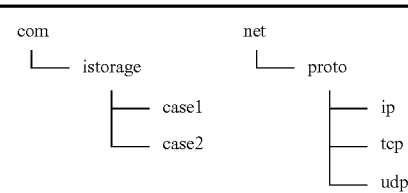

The rule composition helper 814 can help to compose rules. The rule composition helper 814 can interact with the global rule-base service 830 to suggest a set of rules that can be used. The rule composition helper 814 can further have a function to convert data patterns and corresponding behavior to a rule files that interacts with external machine learning components, such as machine learning component 140 of FIG. 1, to generate rules. For example, after confirmation that abnormal behavior identified by the machine learning component is indeed abnormal, the rule composition helper 814 can take the identified abnormal behavior as an input to create a rule to be stored in at least one of the rule-bases 820 and 832.

The rule finder 816 can visualize rules stored in the local rule-base 820, which can return a hierarchical structure of a rule set for a given data set, machine or distributed system. Furthermore, a same data type can be generated from the same applications from different machines. To keep track of such relationships, the data to rule mapper 818 is configured to map data from a log database, such as the log database 134 of FIG. 1, with rules in the local rule-base 820.

When a new dataset is introduced in the local service, a user may need to come up with a rule set to associate with the new dataset. A rule suggest service 834 can be provided to suggest a set of rules that could be used for the new dataset. If the user provides the new dataset, the rule suggest service 834 can extract patterns from the data and map the patterns to existing patterns in one or more of the rule-bases 820 and 832 to return a set of rules.

An example of an input rule is provided with reference to FIG. 9.

As we are entering the big data era, pattern/behavior analytics have been widely used in various applications in different areas including, but not limited to, financial stocks, future trading, system enhancement, data-driven security, etc. One aspect of utilizing pattern/behavior analytics in such applications is the extraction of patterns and behaviors from the time-series data. To achieve this goal, in the field of temporal query analysis, temporal query analysis tools can be used to create data relationships based on temporal order. Examples of such data relationships include "A event happens followed by B event", "A event and B event happen together", or "A event overlaps with B event". Although conventional database management systems can include functionality to query temporal relationships from data stored in a database, the data scale and analysis complexity have exceeded the processing ability of such database systems. For example, to use conventional database management systems to perform temporal query analysis, users need to write complex queries and spend plenty of effort to debug queries, then wait hours, and even days, for the final results. Moreover, the analysis procedure can overwhelm available computational resources without any results being returned.

As mentioned, conventional database management systems provide support for temporal queries. However, applications built on top of these database management systems suffer from efficiency and scalability challenges. Data-intensive scalable computing systems, such as Spark®, do not provide solutions for temporal queries, which requires users to translate temporal-related data analysis into compatible queries in such systems. AsterixDB® is a scalable, distributed big data management system that supports flexible data model, distributed storage and transaction, fast data ingestion. In terms of temporal query, AsterixDB® supports Allen's interval algebra over interval types defined in AsterixDB®. The temporal query support in AsterixDB® is limited to interface level, where temporal queries will eventually be translated into traditional queries. In order to leverage the interval types provided in AsterixDB®, applications need to use it as underlying storage layer, or reload data into it to achieve higher performance. Moreover, AsterixDB® doesn't provide a cost-based query optimizer for temporal queries. Accordingly, the generation of an optimal execution plan for temporal queries cannot be guaranteed.

The BAE framework described above with reference to FIGS. 1-9 is an efficient mechanism that makes it easy to write a rule to analyze logs (e.g., structured logs) using logical, set, and temporal operators. As described above, using BAE, a user can write a simple rule to extract meaningful behaviors and patterns without worrying about writing a lengthy and complicated SQL query. Moreover, the BAE framework can leverage in-memory database technology, such as a Structured Query Language (SQL) (e.g., Spark® SQL), to increase the speed of query processing. Given an input rule and data, BAE can dynamically generate a query that reflects the behavior defined in a rule, and execute the query on multiple tables of data. However, since a temporal operator requires a table join operation, having multiple temporal operators in a rule can eventually lead to performance bottleneck in the BAE framework due to the table join operation being one of the most expensive operations.

The embodiments described herein provide for optimization strategies for temporal query analysis which include underlying physical algorithm optimization, a runtime query optimizer for optimal temporal execution plan generation, and upper-level temporal query interfaces wrapped with temporal behavior operators.

For example, the embodiments described herein provide for optimized table join operators for temporal operators to improve query processing. The optimized table join algorithms can be an order of magnitude faster than temporal join operators based on the normal join operator given in SQL.

Apart from the temporal operator optimization, another aspect of query optimization is query processing ordering. The embodiments described herein further provide for a design of a runtime cost-based query optimizer for optimal query execution plan generation using a sampling strategy, and can be designed specifically for temporal queries. For example, without knowing any prior knowledge about a dataset, the BAE framework can efficiently collect statistics from the dataset at runtime to decide an optimal join order. After the statistics are collected at runtime, the optimizer in accordance with the embodiments described herein can utilize the statistics to generate the optimal query execution plan, and can modify the scheduled plan at runtime. Unlike other sampling methodologies, the goal of the sampling strategy described herein is to read data "once" into the memory and to decide an execution order with samples to minimize a long data reading time (e.g., sampling and reading data together).

Figure 10:
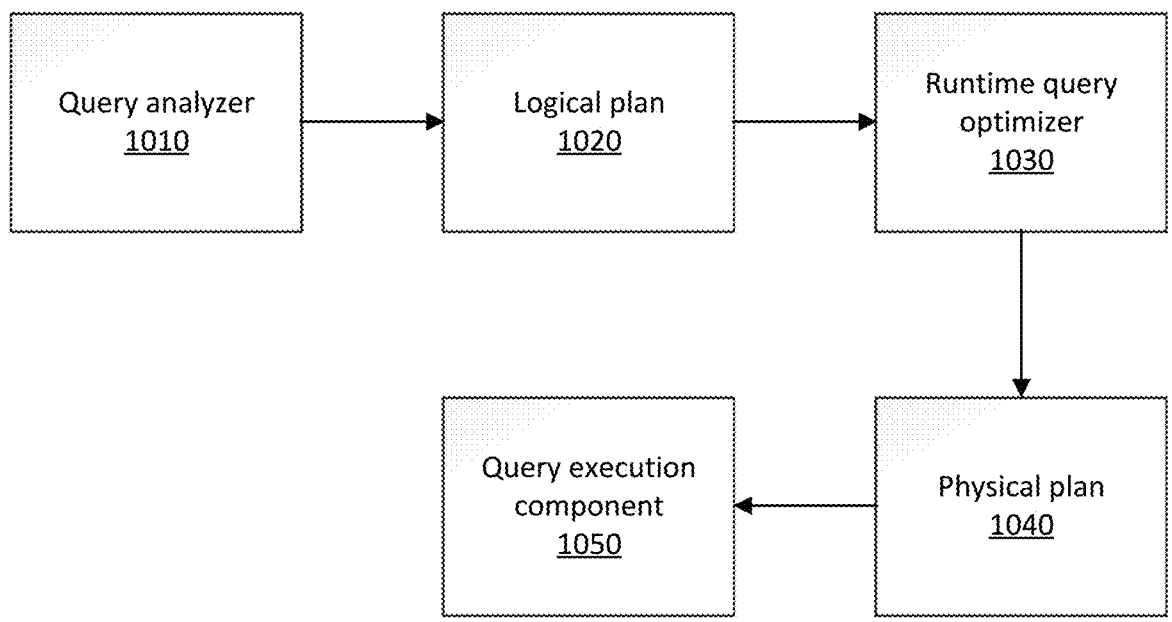
FIG. 10 is a block diagram illustrating an overview of a system/method for implementing a query processing system, in accordance with the present principles.

Referring now in detail to the figures in which like numerals represent the same or similar elements, FIG. 10 shows an overview of a query processing system 1000 illustratively depicted in accordance with one embodiment of the present principles. In one embodiment, the system 1000 is designed to process temporal queries. However, any type of query can be processed by the system 1000, in accordance with the embodiments described herein.

As shown, the system 1000 includes a query analyzer 1010, a logical plan 1020, a runtime query optimizer 1030, a physical plan 1040, and a query execution component 1050.

The query analyzer 1010 receives queries (e.g., temporal queries), and analyzes the queries to generate logical plans, such as the logical plan 1020, by translating the queries. The logical plan 1020 includes a series or bundle of operators (e.g., temporal operators) and related states/datasets. Primitive rule-based optimizations can be applied to generate the logical plan 1020.

The optimizer 1030 can be a cost-based optimizer that finds an optimal query execution plan. In one embodiment, the optimizer 1030 is specifically designed for temporal queries, which do not require upfront statistics of involved datasets to determine a physical plan. Several design principles for the optimizer 1030 includes (1) read data from the disk only once; (2) no upfront statistics involved; (3) ignorable runtime overhead; (4) guarantee accuracy for (temporal) queries; and (5) support runtime plan modification. Based on these design principles, online sampling and runtime execution can be used as strategies to collect runtime statistics.

The optimizer 1030 translates the logical plan 1020 into a physical plan 1040. Similar to the logical plan 1020, the physical plan 1040 includes a series or bundle of operators (e.g., temporal operators) and related states/datasets. Accordingly, the optimizer 1030 can iteratively collect statistics at runtime with ignorable overhead introduced, and can continuously generate physical plans for execution. Further details regarding the optimizer 1030 will be described below with reference to FIG. 16.

The query execution component 1050 schedules the execution of queries according to the physical plan 1040. The actual implementation of each operator will be called during the execution.

Further details regarding the optimization of query plans will now be described with reference to temporal query plans. However, it is to be understood and appreciated that other types of query plans can be optimized in accordance with the embodiments described herein.

Temporal join processes can be implemented to execute temporal operators. To enable optimal or efficient temporal operator execution, there are two principles or considerations for the temporal join processes: (1) leveraging high parallelism and throughput provided by the distributed environment; and (2) taking advantage of temporal-related attributes to improve efficiency and reduce computational complexity.

Figure 11:
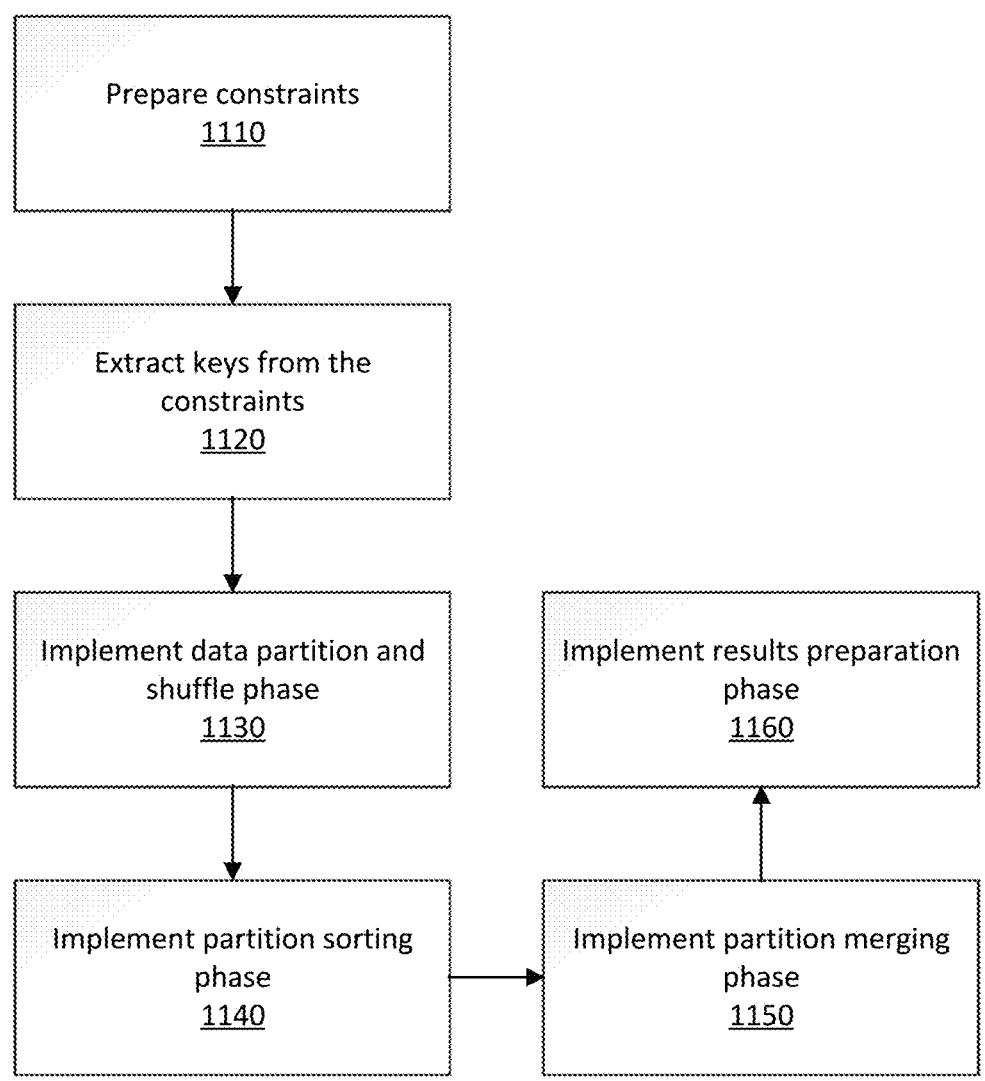
FIG. 11 is a block diagram illustrating a system/method for implementing temporal join process to optimize execution of temporal operators, in accordance with the present principles.

Referring to FIG. 11, a block/flow diagram 1100 is provided illustrating an exemplary system/method 1100 for implementing temporal join processes to optimize execution of temporal operators.

At block 1110, constraints are prepared. The constraints can include normal constraints and temporal constraints. In one embodiment, key temporal constraints can be derived from the normal constraints/temporal constraints.

At block 1120, keys are extracted from the constraints. The keys can include one or more partition keys extracted from the normal constraints and one or more sorting keys extracted from the temporal constraints.

At block 1130, a data partition and shuffle phase is implemented. For example, data can be partitioned and shuffled based on the partition key(s).

At block 1140, a partition sorting phase is implemented. For example, each partition can be sorted based on the sorting key(s) and the partition key(s).

At block 1150, a partition merging phase is implemented. For example, the partition merging phase can include finding matched rows and using key temporal constraints (if any) to minimize complexity.

At block 1160, a results preparation phase is implemented. For example, a combination of the normal constraints without join keys and temporal constraints can be used to filter out results output by the partition merging phase to obtain final results.

The system/method 1100 has been described as a generalization of an optimization process. However, since input conditions differ between different temporal operator implementations, the actual implementation of the optimization process of the system/method 1100 will differ slightly based on the temporal operator implementation.

Examples of temporal operators include Leadto, LeadtoPair, During, Overlap, Start with, End with and Equal. To describe how the optimization described in FIG. 11 can be implemented for specific temporal operators, temporal operators will be divided into three groups based on similarity of implementation. Group 1 includes Leadto and LeadtoPair, group 2 includes During and Overlap, and group 3 includes Startwith and Endwith. Since the Equal operator is translated into the normal join, it will not be introduced here. Furthermore, to simplify the description, only two states (state1 and state2) will be used.

Regarding group 1, at block 1110, constraints including temporal constraints and normal constraints are prepared. The temporal constraints for both the Leadto and LeadtoPair operators will be "state1.endtime<state2.begintime", and the normal constraint will be all the other constraints specified in the query. Key temporal constraints do not need to be derived from the normal/temporal constraints for the group 1 operators.

At block 1120, a partition key is extracted including attributes from each dataset connected by an equality operator in normal constraint. The sorting key extracted for state1 can be "state1.endtime" and the sorting key extracted for state2 can be "state2.begintime". After the extraction, the rest constraints in the normal constraints can be combined with the temporal constraints to form verification conditions (VER_CON).

At block 1130, hash-based functions can be used to partition data in each dataset according to the partition key, and then the rows in each dataset can be shuffled to different partitions.

At block 1140, each shuffled partition of two datasets is shuffled with the partition key, and rows with the same partition key will form a row group. The rows in each row group can then be sorted with the sorting keys.

At block 1150, the Leadto and LeadtoPair operators can have different corresponding partition merging processes. Regarding Leadto, for each partition of state1(PAR_left) and the corresponding partition of state2(PAR_right), a Leadto partition merging process is performed to find matched rows and push down the verification conditions to locate the first match. Regarding LeadtoPair, for each partition of state1 (PAR_left) and the corresponding partition of state2(PAR_right), a LeadtoPair partition merging process is performed to find matched rows and push down the verification conditions to locate the first match. An exemplary Leadto partition merging process 1200 is provided with reference to FIG. 12, and an exemplary LeadtoPair partition merging process 1300 is provided with reference to FIG. 13.

At block 1160, the row pairs output by the partition merging process are the results for the partition merging process.

Regarding group 2, at block 1110, constraints including temporal constraints, normal constraints and key temporal constraints are prepared. The temporal constraints for the Overlap operator include "state1.begintime>state2.begintime", "state1.begintime<state2.endtime", and "state2.endtime<state1.endtime". The temporal constraints for the During operator include "state1.begintime>state2.begintime" and "state1.endtime<state2.endtime". The key temporal constraints (KEY_TEMP_CON) for both the Overlap and During operators include "state1.begintime>state2.begintime".

At block 1120, a partition key is extracted including attributes from each dataset connected by an equality operator. The sorting key extracted for state1 can be "state1.endtime" and the sorting key extracted for state2 can be "state2.begintime". After the extraction, the rest constraints in the normal constraints can be combined with the temporal constraints to form verification conditions (VER_CON).

At block 1130, hash-based functions can be used to partition data in each dataset according to the partition key, and then the rows in each dataset can be shuffled to different partitions.

At block 1140, each shuffled partition of two datasets is shuffled with the partition key, and rows with the same partition key will form a row group. The rows in each row group can then be sorted with the sorting keys. Since there are two sorting keys, one of the sorting keys can be used to perform a first sort, and the other one of the sorting keys can be used to perform a second sort inside groups with the same first sorting key.

At block 1150, for each partition of state1(PAR_left) and the corresponding partition of state2(PAR_right), a partition merging process corresponding to the Overlap/During operations is performed to find matched rows and push down the verification conditions to locate the first match. An exemplary process 1400 is provided with reference to FIG. 14.

At block 1160, row pairs inside the <output> array from the partition merging process are output as results of the process.

Regarding group 3, both the Startwith ("sw") and Endwith ("ew") operators can have two different cases, the regular case and the time constraint case. For the regular case, both state1 and state2 have the same begintime/endtime, and translating the operator into normal joins and taking begintime/endtime as one of the join keys can boost efficiency. Although both cases are supported by the following description, the optimization will focus more on the time constraint case (e.g., "sw[tc]" and "ew[tc]").

At block 1110, constraints including temporal constraints, normal constraints and key temporal constraints are prepared.

The temporal constraints for the "sw" operator include "state1.begintime=state2.begintime", the temporal constraints for the "sw [tc]" operator include "state1.begintime=state2.begintime+num", the temporal constraints for the "ew" operator include "state1.endtime=state2.endtime", and the temporal constraints for the "ew" operator include state1.endtime=state2.endtime+num".

The key temporal constraints (KEY_TEMP_CON) for the "sw" operator include "state1.begintime>=state2.begintime+num", and the key temporal constraints for the "ew" operator include state1.endtime>=state2.endtime+num".

For both operators, the normal constraint will be all the other constraints specified in the query.

At block 1120, a partition key is extracted including attributes from each dataset connected by an equality operator. In the "sw" implementation, sorting keys for each state will be the corresponding begintime (e.g., state1.begintime for state1), and in the "ew" implementation, sorting keys for each state will be the corresponding endtime (e.g., state1.endtime for state1). After the extraction, the rest constraints in the normal constraints can be combined with the temporal constraints to form verification conditions (VER_CON).

At block 1130, hash-based functions can be used to partition data in each dataset according to the partition key, and then the rows in each dataset can be shuffled to different partitions.

At block 1140, each shuffled partition of two datasets is shuffled with the partition key, and rows with the same partition key will form a row group. The rows in each row group can then be sorted with the sorting keys. Since there are two sorting keys, one of the sorting keys can be used to perform a first sort, and the other one of the sorting keys can be used to perform a second sort inside groups with the same first sorting key.

At block 1150, for each partition of state1(PAR_left) and the corresponding partition of state2(PAR_right), a partition merging process corresponding to the Startwith/Endwith operations is performed to find matched rows and push down the verification conditions to locate the first match. An exemplary process 1500 is provided with reference to FIG. 15.

At block 1160, row pairs inside the <output>array from the partition merging process are output as results of the process.

Figure 16:
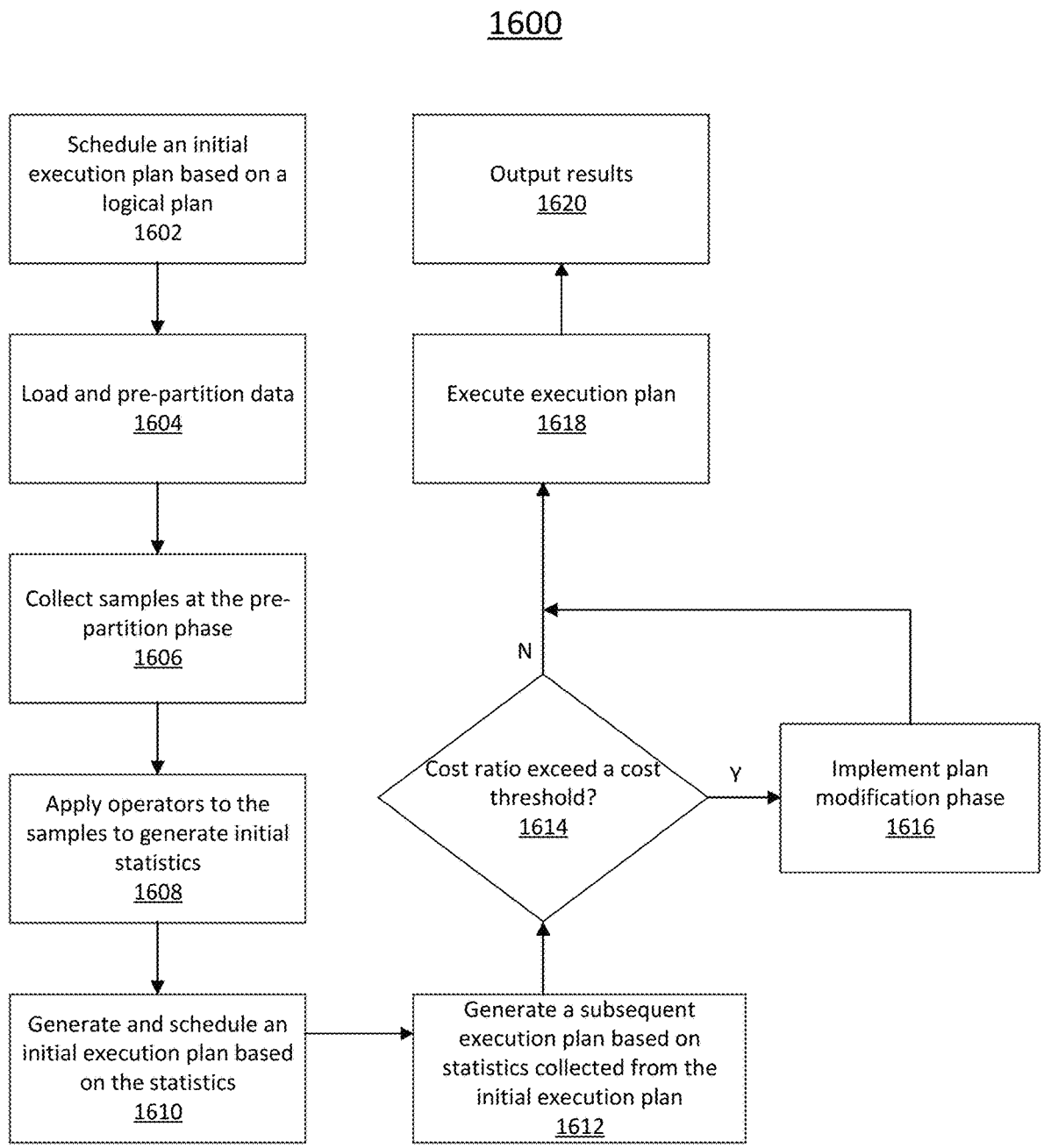
FIG. 16 is a block diagram illustrating a system/method for implementing a runtime query optimizer of a query processing system, in accordance with the present principles.

As discussed above in FIG. 10, based on design principles for a runtime query optimizer, online sampling and runtime execution can be used as strategies to collect runtime statistics for implementing the runtime query optimizer. Referring to FIG. 16, a block/flow diagram is provided illustrating an exemplary system/method 1600 for implementing a runtime query optimizer, such as optimizer 1030 of FIG. 10.

At block 1602, an initial execution plan is scheduled as a temporary execution plan based on a logical plan. For example, the initial execution plan can be scheduled according to primitive information (e.g., dataset raw size). As will be described in further detail below, if the initial execution plan is determined to be inefficient, the initial execution plan will be modified to determine the actual execution plan.

At block 1604, data is loaded and pre-partitioned for shuffle. When the initial execution plan is scheduled, the data can be automatically loaded into memory and pre-partitioned based on partition keys. In this phase, the actual shuffle phase is paused in case the temporary execution plan has to be modified.

At block 1606, samples are collected at the pre-partition phase. The samples, which are collected for each involved dataset, can be collected and stored while reading data into memory. Uniform sampling and universe sampling strategies can be provided as a built-in library. User-defined sampling strategies can also be provided as long as they follow standard interfaces.

At block 1608, after samples of each dataset are collected, operators (e.g., temporal operators) are applied to samples to generate and collect initial statistics.

At block 1610, to initiate the optimization process, an initial execution plan is generated and scheduled based on the initial statistics.

At block 1612, a subsequent execution plan for a subsequent execution is generated based on subsequent statistics generated and collected from the initial execution plan.

At block 1614, it determined whether a ratio of a cost of the initial plan to a cost of the subsequent execution plan (e.g., a cost ratio) exceeds a cost threshold. If the ratio exceeds the cost threshold, a plan modification phase is implemented at block 1616. Otherwise, the initial execution plan is kept due to the trade-off between overhead and gains introduced by the plan modification. To implement the plan modification at block 1616, the affected datasets are re-partitioned, and the shuffle phase, which was paused at block 1602, is resumed.

At block 1618, the execution plan of block 1614 or 1616 is executed.

At block 1620, results are output after all the operators in the query are scheduled for execution.

Embodiments described herein may be entirely hardware, entirely software or including both hardware and software elements. In a preferred embodiment, aspects of the present invention are implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 17:
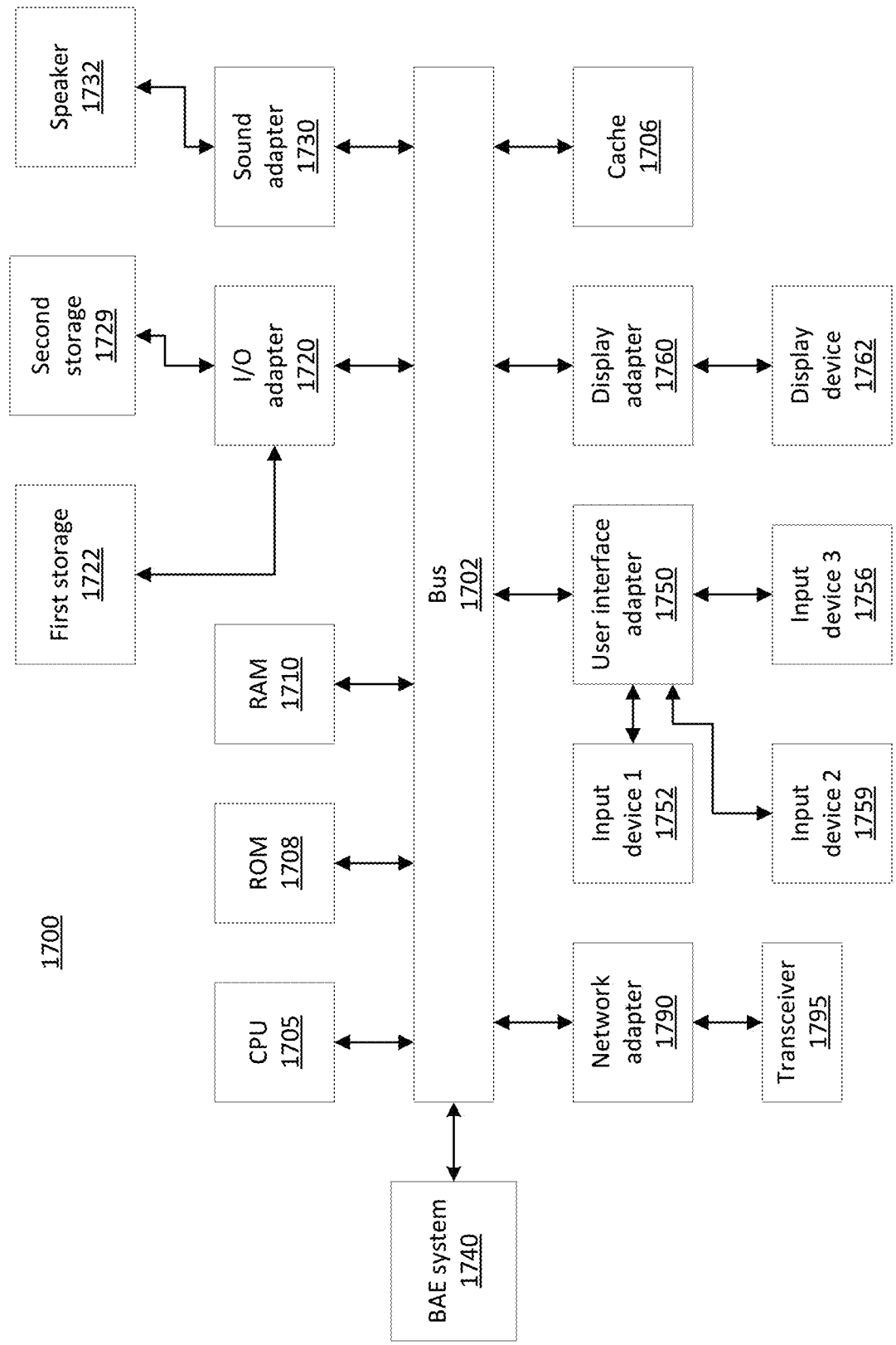
FIG. 17 is a block/flow diagram illustrating a computer system, in accordance with the present principles.

Referring now to FIG. 17, an exemplary computer system 1700 is shown which may represent a server or a network device, in accordance with an embodiment of the present invention. The computer system 1700 includes at least one processor (CPU) 1705 operatively coupled to other components via a system bus 1702. A cache 1706, a Read Only Memory (ROM) 1708, a Random-Access Memory (RAM) 1710, an input/output (I/O) adapter 1720, a sound adapter 1730, a network adapter 1790, a user interface adapter 1750, and a display adapter 1760, are operatively coupled to the system bus 1702.

A first storage device 1722 and a second storage device 1729 are operatively coupled to system bus 1702 by the I/O adapter 1720. The storage devices 1722 and 1729 can be any of a disk storage device (e.g., a magnetic or optical disk storage device), a solid state magnetic device, and so forth. The storage device 1722 and 1729 can be the same type of storage device or different types of storage devices.

A speaker 1732 may be operatively coupled to system bus 1702 by the sound adapter 1730. A transceiver 1795 is operatively coupled to system bus 1702 by network adapter 1790. A display device 1762 is operatively coupled to system bus 1702 by display adapter 1760.

A first user input device 1752, a second user input device 1759, and a third user input device 1756 are operatively coupled to system bus 1702 by user interface adapter 1750. The user input devices 1752, 1759, and 1756 can be any of a sensor, a keyboard, a mouse, a keypad, a joystick, an image capture device, a motion sensing device, a power measurement device, a microphone, a device incorporating the functionality of at least two of the preceding devices, and so forth. Of course, other types of input devices can also be used, while maintaining the spirit of the present invention. The user input devices 1752, 1759, and 1756 can be the same type of user input device or different types of user input devices. The user input devices 1752, 1759, and 1756 are used to input and output information to and from system 1700.

A BAE system 1740 may be operatively coupled to system bus 1702. The anomaly detector 1740 is configured to perform the operations described above with reference to FIGS. 1-9 and/or 10-16. At least a portion of the BAE system 1740 can be implemented as a standalone special purpose hardware device, or may be implemented as software stored on a storage device. In the embodiment in which the at least a portion of the BAE system 1740 is software-implemented, although the BAE system 1740 is shown as a separate component, the software-implemented portions of the BAE system 1740 can be stored on the first storage device 1722 and/or the second storage device 1729. Alternatively, the software-implemented portions of the BAE system 1740 can be stored on a separate storage device (not shown).

Of course, the computer system 1700 may also include other elements (not shown), as readily contemplated by one of skill in the art, as well as omit certain elements. For example, various other input devices and/or output devices can be included in computer system 1700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the computer system 1700 are readily contemplated by one of ordinary skill in the art given the teachings of the present invention provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for optimizing query execution to improve query processing by a computer, comprising:
   analyzing, by at least one processor device operatively coupled to a memory, a temporal query for querying at least one temporal relationship between at least first data and second data stored in a database based on one or more local rules stored in a local rule-base and one or more global rules stored in a global rule-base, the one or more local rules being received via a user interface and the one or more global rules being created by one or more distributed applications;
   translating, by the at least one processor device, the temporal query into a logical plan;
   applying, by the at least one processor device, a runtime query optimizer to the logical plan to identify a physical plan including temporal operators for execution, including designing temporal join processes to optimize execution of the temporal operators by:
      extracting keys from constraints, including extracting one or more partition keys from one or more normal constraints and one or more sorting keys from one or more temporal constraints;
      partitioning data into partitions using a hash-based function and shuffling the partitions based on the one or more partition keys to obtain one or more row groups;
      sorting rows in each of the one or more row groups based on the one or more sorting keys to obtain sorted rows;
      implementing a partition merging phase by finding matched rows among the sorted rows; and
      filtering results of the partition merging phase;
   translating, by the at least one processor device, the logical plan into the physical plan; and
   scheduling, by the at least one processor device, execution of the query according to the physical plan.

2. The method of claim 1, wherein the constraints further include key temporal constraints.

3. The method of claim 1, wherein applying the runtime query optimizer to the logical plan to find the physical plan includes determining whether to implement a plan modification phase.

4. The method of claim 3, wherein determining whether to implement the plan modification phase includes:
   scheduling a first execution plan according to primitive information;
   collecting samples of data;
   applying operators to the samples of data to generate statistics;
   generating a second execution plan based on the statistics;
   comparing a ratio of a cost of the first plan to a cost of the second plan to a threshold; and
   implementing the plan modification phase based on the second execution plan in response to the ratio exceeding the threshold.

5. The method of claim 4, further comprising loading, by the at least one processor device, the data into memory and pre-partitioning, by the at least one processor device, the data in response to the scheduling of the first execution plan.

6. The method of claim 1, wherein the temporal operators include at least one operator selected from the group consisting of: Leadto, LeadtoPair, During, Overlap, Startwith, Endwith, and Equal.

7. A computer program product comprising a non-transitory computer readable storage medium having program instructions embodied therewith, the program instructions executable by a computer to cause the computer to perform a method for optimizing query execution to improve query processing by a computer, the method comprising:
   analyzing a temporal query for querying at least one temporal relationship between at least first data and second data stored in a database based on one or more local rules stored in a local rule-base and one or more global rules stored in a global rule-base, the one or more local rules being received via a user interface and the one or more global rules being created by one or more distributed applications;
   translating the temporal query into a logical plan;
   applying a runtime query optimizer to the logical plan to identify a physical plan including temporal operators for execution, including designing temporal join processes to optimize execution of the temporal operators by:
      extracting keys from constraints, including extracting one or more partition keys from one or more normal constraints and one or more sorting keys from one or more temporal constraints;
      partitioning data into partitions using a hash-based function and shuffling the partitions based on the one or more partition keys to obtain one or more row groups;
      sorting rows in each of the one or more row groups based on the one or more sorting keys to obtain sorted rows;
      implementing a partition merging phase by finding matched rows among the sorted rows; and
      filtering results of the partition merging phase;
   translating the logical plan into the physical plan; and
   scheduling execution of the query according to the physical plan.

8. The computer program product of claim 7, wherein the constraints further include key temporal constraints.

9. The computer program product of claim 7, wherein applying the runtime query optimizer to the logical plan to find the physical plan includes determining whether to implement a plan modification phase.

10. The computer program product of claim 9, wherein determining whether to implement the plan modification phase includes:
    scheduling a first execution plan according to primitive information;
    collecting samples of data;
    applying operators to the samples of data to generate statistics;
    generating a second execution plan based on the statistics;
    comparing a ratio of a cost of the first plan to a cost of the second plan to a threshold; and
    implementing the plan modification phase based on the second execution plan in response to the ratio exceeding the threshold.

11. A system for optimizing query execution to improve query processing by a computer, comprising:
   at least one processor device operatively coupled to a memory and configured to:
     analyze a temporal query for querying at least one temporal relationship between at least first data and second data stored in a database based on one or more local rules stored in a local rule-base and one or more global rules stored in a global rule-base, the one or more local rules being received via a user interface and the one or more global rules being created by one or more distributed applications;
     translate the temporal query into a logical plan;
     apply a runtime query optimizer to the logical plan to identify a physical plan including temporal operators for execution by designing temporal join processes to optimize execution of the temporal operators by:
       extracting keys from constraints, including extracting one or more partition keys from one or more normal constraints and one or more sorting keys from one or more temporal constraints;
       partitioning data into partitions using a hash-based function and shuffling the partitions based on the one or more partition keys to obtain one or more row groups;
       sorting rows in each of the one or more row groups based on the one or more sorting keys to obtain sorted rows;
       implementing a partition merging phase by finding matched rows among the sorted rows; and
       filtering results of the partition merging phase;
     translate the logical plan into the physical plan; and
     schedule execution of the query according to the physical plan.

12. The system of claim 11, wherein the constraints further include key temporal constraints.

13. The system of claim 11, wherein the at least one processor device is further configured to apply the runtime query optimizer to the logical plan to find the physical plan by determining whether to implement a plan modification phase.

14. The system of claim 13, wherein the at least one processor device is further configured to determine whether to implement the plan modification phase by:
   scheduling a first execution plan according to primitive information;
   collecting samples of data;
   applying operators to the samples of data to generate statistics;
   generating a second execution plan based on the statistics;
   comparing a ratio of a cost of the first plan to a cost of the second plan to a threshold; and
   implementing the plan modification phase based on the second execution plan in response to the ratio exceeding the threshold.

15. The system of claim 14, wherein the at least one processor device is further configured to execute program code stored on the memory device to load the data into memory and pre-partition the data in response to the scheduling of the first execution plan.

* * * * *